United States Patent [19]
Snyder

[11] 3,758,850
[45] Sept. 11, 1973

[54] FLUX VALVE APPARATUS FOR SENSING TOTAL HORIZONTAL AND VERTICAL AMBIENT UNIDIRECTIONAL MAGNETIC FIELD

[75] Inventor: George W. Snyder, Phoenix, Ariz.
[73] Assignee: Sperry Rand Corporation, New York, N.Y.
[22] Filed: Mar. 17, 1972
[21] Appl. No.: 235,584

[52] U.S. Cl. .................................... 324/43 R
[51] Int. Cl. ................................... G01r 33/04
[58] Field of Search ............... 324/43 R; 33/361, 33/355

[56] References Cited
UNITED STATES PATENTS
2,373,096  4/1945  Bonell .................. 324/43 R
2,403,347  7/1946  Depp et al. ............. 324/43 R
3,573,610  4/1971  Kesselring ............. 324/43 R Primary Examiner—Robert J. Corcoran
Attorney—Howard P. Terry

[57] ABSTRACT

A flux valve for sensing the total unidirectional ambient magnetic field in the vicinity of the valve comprising three equiangularly oriented magnetically permeable cores each including a pair of generally coextensive parallely extending elongated core members supported from a centrally disposed non-magnetic post, the cores being so constructed and arranged as to collect both the horizontal and vertical field components in the vicinity of the valve. An excitation coil magnetically coupled to the cores produces a circulating magnetic flux flowing simultaneously in all three cores in instantaneously opposite directions in the core members of each core while pickoff coils surrounding each core provide signals representative of the total unidirectional magnetic flux directed therethrough.

13 Claims, 8 Drawing Figures

FLUX VALVE APPARATUS FOR SENSING TOTAL HORIZONTAL AND VERTICAL AMBIENT UNIDIRECTIONAL MAGNETIC FIELD

The invention herein described was made in the course of or under a contract of subcontract thereunder with the Department of the Air Force.

BACKGROUND OF THE INVENTION

1. Field of the Invention

This invention relates generally to flux valves as used in magnetic compass systems and more particularly to a novel flux valve, adapted for strapped-down operation, and the combination of the valve with signal processing circuits for driving three mutually orthogonal magnetic field components from the composite or total magnetic field sensed by the valve.

2. Description of the Prior Art

The conventional flux valve used in magnetic compass systems for craft navigation typically comprises three Y-connected horizontally oriented high permeability magnetic core legs each including a pair of generally parallel closely spaced inductors for sensing the horizontal component of the earth's magnetic field. An alternating current excitation coil located at the junction of the core legs provides an exciting magnetomotive force to produce instantaneously oppositely directed magnetic fluxes in the respective inductors of each core leg. In response to this exciting magnetomotive force, the earth's magnetic field alternately moves without and within the core legs as the excitation cyclically increases and decreases from its quiescent or average level. The resulting output signals provided by pickoff coils surrounding the respective core legs thus have a frequency equal to twice the frequency of the excitation signal and when combined in conventional multicircuit or three wire fashion produces a composite voltage vector representative of the orientation of the valve relative to the earth's horizontal field component.

In the early state of the art it was the customary practice, in the interest of sensing only the horizontal component of the earth's field, to maintain the core legs of the valve in a horizontal plane by use of a gyro stabilized platform or some sort of pendulous support. Numerous difficulties and disadvantages are attendant to such systems, however; and, accordingly, several years ago there was disclosed by D. H. Baker in U.S. Pat. No. 2,998,727 issued Sept. 5, 1961 and assigned to the instant assignee, a system which employs a modified flux valve having three mutually perpendicular core legs, two of the legs being normally horizontally oriented and the other leg normally vertically oriented in a level condition of the craft on which the valve is mounted. This modified valve is used in combination with a pair of pendulously supported resolvers or synchro pendulums for providing a resultant signal representative of the lateral and longitudinal components of the earth's horizontal field irrespective of the craft's attitude. The Baker system thus avoided the use of a stabilized or pendulously supported flux valve by using instead a strapped-down valve of unique construction in combination with pendulously supported resolvers. In order to eliminate the need for any pendulous or stabilized components, a more recently devised system disclosed by W. W. Burmeister in U.S. Pat. No. 3,628,254, issued Dec. 21, 1971 and also assigned to the instant assignee, uses a strapped-down valve comprising a conventional three legged horizontal field sensor in combination with a vertical field sensor. Cross-coupling of the horizontal and vertical components of the earth's field into the respective sensors under a condition of pitching and rolling motion of the craft is compensated by using the normally vertical sensor signal, appropriately modified in accordance with pitch and roll data, to induce unidirectional magnetic fields in the legs of the normally horizontal sensor such that the composite lateral and longitudinal fields thereabout, constituted of the earth's horizontal and vertical components together with the induced fields, are equivalent to the corresponding components of the earth's horizontal field irrespective of the craft attitude. Thus, a true strapped-down system is provided. It has been found, however, that where relatively compact packaging is desired to minimize the exterior dimensions of the valve assembly, coupling tends to occur between the horizontal and vertical sensors causing uncontrollable harmonics in the output signals.

It is a principal object of the present invention to provide a novel unitary compact flux valve assembly which is not subject to the above described cross-coupling problems and which is adapted for strapped-down operation without the need for local pendulous or gyro stabilized components.

SUMMARY OF THE INVENTION

A physical embodiment of the present invention is conveniently and preferably obtained by suitably modifying a three legged valve of the type disclosed in U.S. Pat. No. 3,573,610 issued Apr. 6, 1971 to D. J. Kesselring and assigned to the instant assignee. The Kesselring valve incorporates a normally horizontal three legged core structure equiangularly disposed about a center support member in combination with an excitation coil and pickoff coils interconnected in the customary multicircuit fashion and further includes, at the extending ends of the core legs, arcuate shaped lateral flux collectors appropriately configured and disposed relative to one another to minimize one cycle errors while simultaneously increasing the ambient magnetic field density in the vicinity of the pickoff coils.

In accordance with the present invention, three additional equiangularly distributed cores are provided as extensions of the Y-arranged core legs for collecting the vertical component of the earth's field along with the horizontal component. These additional cores, like the Y-connected core legs, each comprise a pair of inductors or core members arranged in generally parallel closely spaced relation and connecting transversely from the extending ends of the core leg inductors back to the center support member at a point removed from the junction of the horizontal core legs. These additional core members or inductors will be referred to hereinafter as vertical field collectors. An additional excitation coil is also provided about the center support member at the junction of the vertical collectors to produce an alternating flux flowing simultaneously in all three collectors.

Although the valve is intended to be fixedly secured to a craft in actual operation, the normal attitude of the valve under a level condition of the craft in which it is mounted will be such that the conventional three legged core structure is horizontally oriented with one leg typically aligned parallel to the longitudinal axis of the craft while the additional core members provided in accordance with the present invention are oriented generally transverse to the horizontal orientation. The ambient horizontal field is thus captured in the usual manner by the lateral flux collectors affixed to the ends of the horizontal core legs to be directed through the vicinity of the pickoff coils disposed about the core legs. The vertical field, on the other hand, is captured by the action of the vertical collectors to be directed through the vicinity of the pickoff coils. Thus, in any attitude, level or otherwise, the valve senses the total unidirectional ambient field as represented by respective horizontal and vertical components.

The valve output signal representative of the total sensed field can be processed by appropriately combining the respective pickoff signals to obtain additional signals representative of the vertical field and lateral and longitudinal components of the horizontal field for processing in accordance with conventional coordinate transformation techniques to account for the craft attitude and thereby provide an indication of the craft heading relative to the magnetic north reference. This aspect of the invention will be more fully understood from a reading of the description of the preferred embodiments provided hereinafter. Other features of the inventive apparatus and possible variations thereof will also become apparent from the subsequent detailed description.

DESCRIPTION OF THE PREFERRED EMBODIMENT

Figure 1:
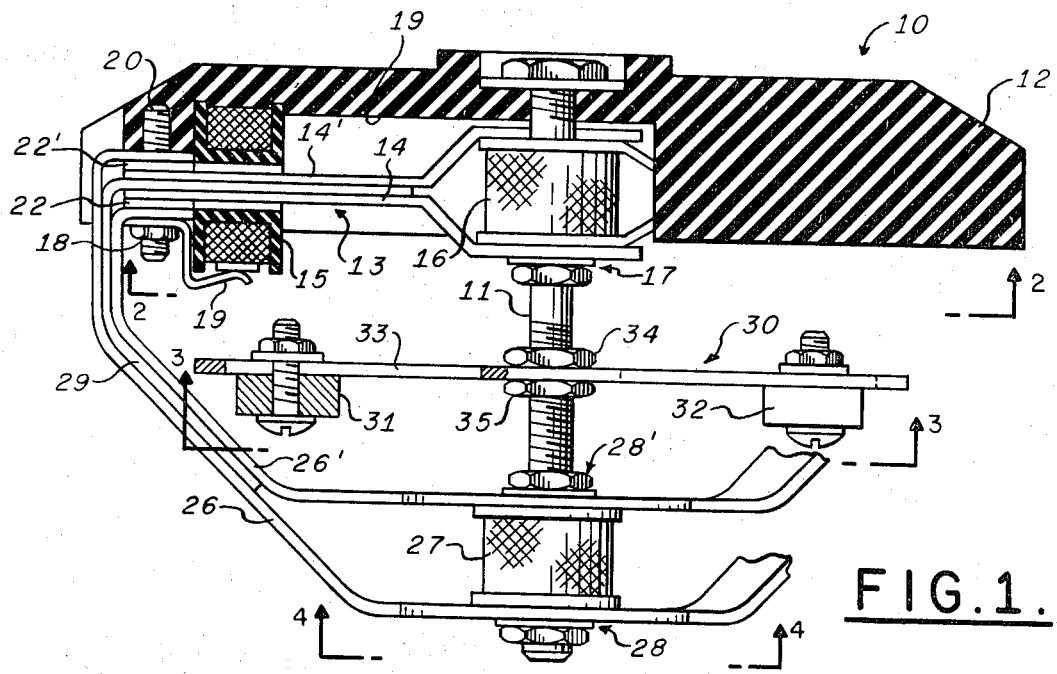
FIG. 1 is a side cross-sectional view of a flux valve embodying the features of the present invention.
Figure 2:
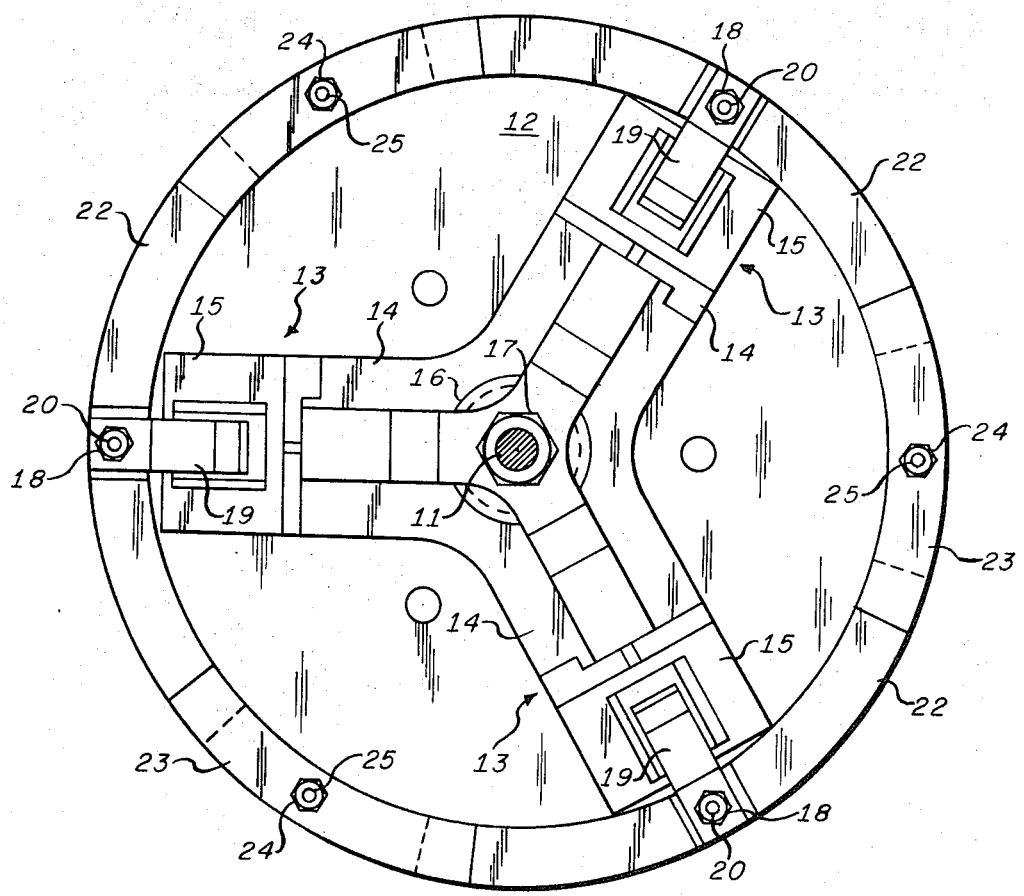
FIG. 2 is a view of the upper portion of the valve taken along the line 2—2 in FIG. 1 indicating the arrangement of the horizontal core legs.

Referring to FIG. 1, the flux valve 10 comprises a non-magnetic centerpost or stud 11 to which a non-magnetic plate 12 is secured near the top of the post. The post 11 and plate 12 cooperate to support the horizontal core structure comprising 120° angularly spaced substantially coplanar core legs 13 which extend radially from the centerpost as is more clearly shown in FIG. 2. Each core leg includes a pair of inductors 14, 14' and a pickoff coil 15 wound around the inductors near their radial extremities. The inductors of the respective core legs are thin flat members of highly permeable magnetic material which are closely spaced in the region of the pickoff coil and separated to a greater degree in bifurcated fashion near the centerpost to accommodate positioning therebetween of excitation coil 16. The horizontal core structure including the inductors and pickoff and excitation coils is held firmly against the contoured or recessed undersurface of plate 12 by means of the nut and washer 17 on post 11 and a nut 18 and spring clamp 19 affixed to stud 20 embedded in the peripheral portion of the plate. Members 22, 22' are the arcuate shaped laterally directed flux collectors connected at their midpoint to the extending ends of the core leg inductors as described in the aforementioned Kesselring patent. The laterally extending ends of these flux collectors are held together in contacting relation securely against the bottom of plate 12 by means of arcuate straps 23 of non-magnetic material positioned in overlapping relation with the ends of the collectors and secured to plate 12 by means of nuts 24 on studs 25 embedded in the plate. In other words, each arcuate strip overlies the adjacent ends of the pairs of lateral collectors and in cooperation with the lower surface configuration of the plate serves to hold the ends of the collectors together in correct position symmetrically disposed about a common horizontal plane. As previously mentioned, the lateral flux collectors function to increase the density principally of the horizontal component of the ambient field which is passed through the region of the pickoff coils.

Figure 4:
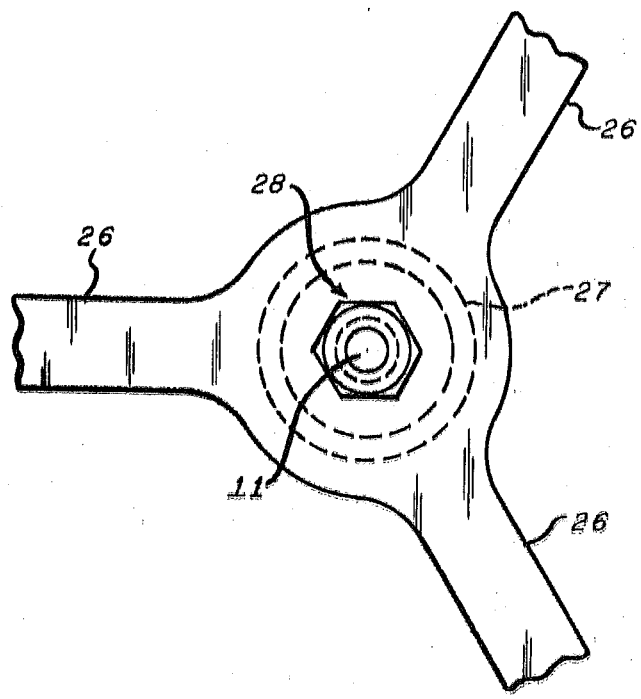
FIG. 4 is a view of the lower portion of the valve taken along the line 4—4 of FIG. 1 indicating the arrangement of the vertical field collectors.

Vertical field collectors 26, 26' are additional inductors or core members of high permeability magnetic material having approximately the same cross-sectional area as the horizontal core leg inductors and lateral flux collectors. These vertical collectors (inductors) form extensions of the horizontal core leg inductors and are directed transversely from the extending ends thereof in generally parallel closely spaced relation in some suitable fashion, as by succession of straight line segments, so as to connect at their other ends to the bottom region of the centerpost where, as in the case of the horizontal core leg inductors, the vertical collectors are bifurcated to accommodate placement therebetween of excitation coil 27. As is more clearly shown in FIG. 4, the vertical field collectors or core members, like the horizontal core legs, are also equiangularly distributed about the centerpost and held securely thereto by means of nuts and washers 28 and 28'. The close parallel spacing of the vertical collectors is used to minimize the overall size of the valve and to permit placement thereabout of pickoff coils, if desired, as will be described subsequently with reference to FIG. 5. An insulator strip 29 is preferably positioned between the closely spaced portions of the respective horizontal core leg inductors and associated vertical field collectors.

Figure 3:
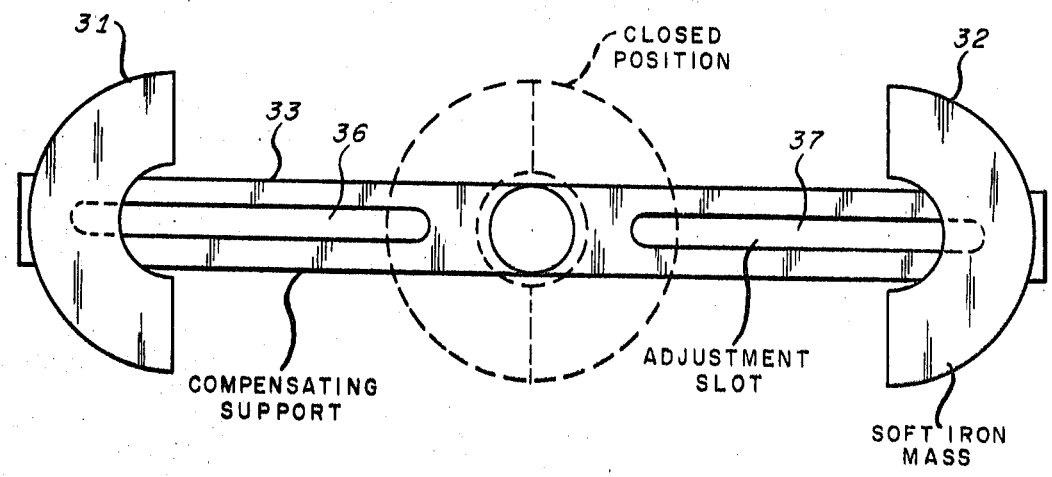
FIG. 3 is a view of the soft iron compensator incorporated in the apparatus of FIG. 1 taken along line 3—3 thereof.

A soft iron compensator 30 comprising half-donut shaped soft iron members 31, 32 bolted to a bar 33 secured to centerpost 11 by nuts 34, 35 is also incorporated in the valve. The soft iron compensator is used in the conventional manner to compensate for two cycle soft iron induced errors by rotating bar 33 about post 11 and sliding the soft iron members along slots 36 and 37, as more clearly shown in FIG. 3, until the desired compensation is effected, at which point the bar and soft iron members are fixedly secured relative to the other components of the valve. A dome shaped enclosure, not shown, is typically affixed to the plate to encompass the valve components and a damping fluid is generally included within the enclosure.

In operation of the valve, excitation coil 16 wound around the top of the centerpost provides an exciting alternating magneto-motive force which produces in the inductors of each core leg an alternating flux that reverses direction for each half cycle of the excitation signal applied to the coil. More specifically, for a condition where the top of the coil may be considered positive, the flux lines are directed out of the coil along inductor 14', then through the lateral flux collectors and back through inductor 14 to the bottom of the coil. In alternate half cycles the flux direction reverses. Likewise, excitation coil 27 wound around the bottom of the centerpost produces flux which alternately reverses direction through the vertical and lateral collectors, the contacting zones of the lateral collectors affording passage of exciting flux from one to the other to the degree of saturation experienced in other parts of the magnetic circuits, that is in the horizontal inductors and vertical collectors. It should be understood, however, that the lateral flux collectors are not essential to the valve operation and in their absence the excitation coils could be connected in series aiding fashion to establish the flux flow serially through the excitation coils by way of the interconnection of the horizontal inductors and vertical collectors of each 120° angularly spaced pair.

The action of the valve in responding to the horizontal and vertical components of an ambient field such as the earth's magnetic field will now be described with reference to FIGS. 5, 6a and 6b. As mentioned hereinbefore, the valve is intended for strapped down use and will customarily be mounted in a craft, in which it is incorporated as part of a magnetic compass system, with one of the horizontal core legs aligned parallel to the longitudinal craft axis. The following description of the operation of the valve is given with this orientation in mind. Moreover, it will be appreciated that the designation of the core legs as being horizontal refers, of course, only to the normally horizontal attitude of the craft in a condition of zero pitch and roll. In any event, irrespective of the attitude of the craft or valve, both the horizontal and vertical components of the ambient magnetic field will combine to produce an output signal in the respective pickoff coils wound around the respective horizontal core legs.

Figure 5:
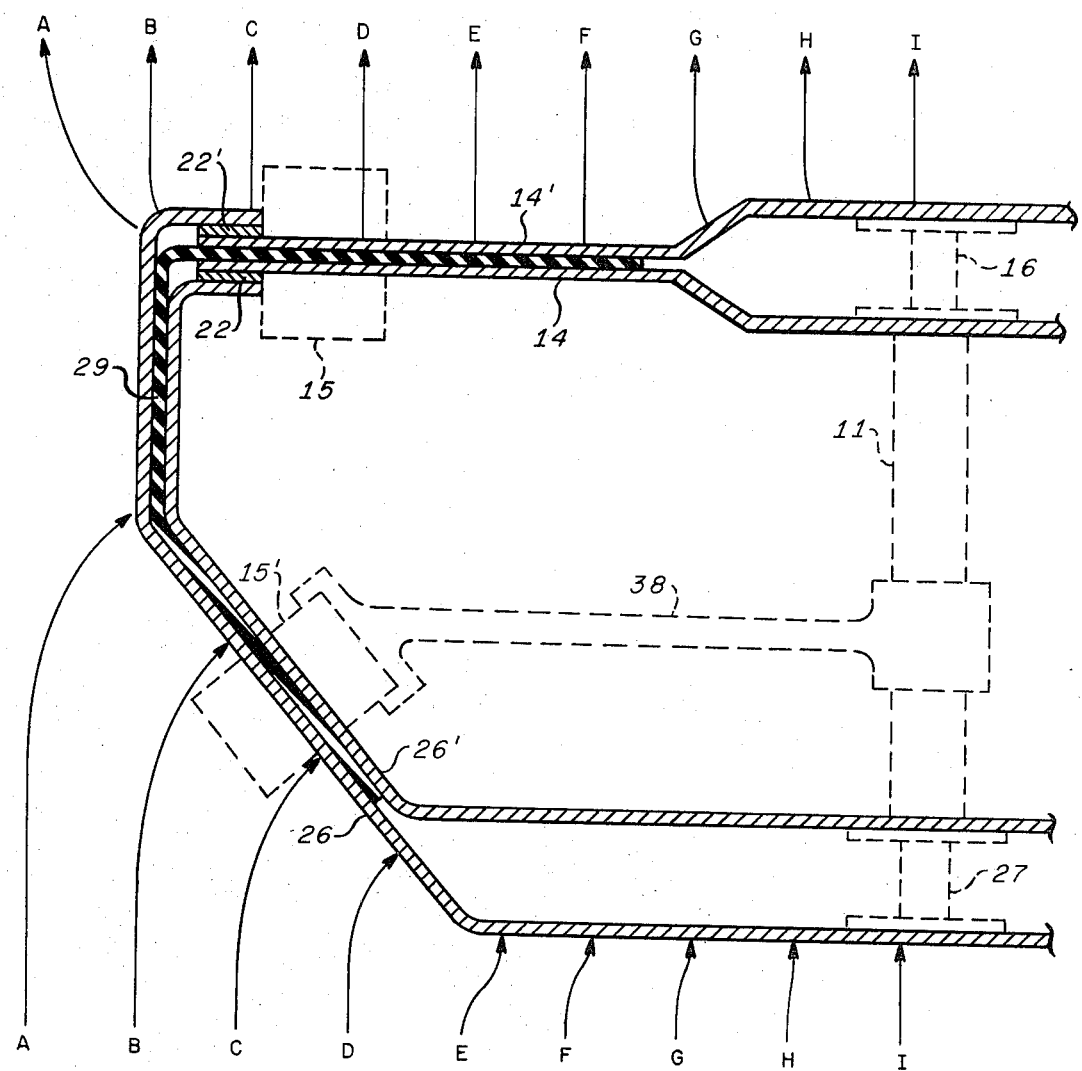
FIG. 5 is a simplified side view of the valve illustrating the orientation of the ambient vertical field lines relative to the horizontal core legs and vertical field collectors.

Referring now to FIG. 5, the vertical field lines represented by letters A through H are observed to impinge on the lower vertical collector and then leave the valve by way of the upper horizontal inductor. The horizontal field lines, not shown, are oriented normal to the vertical field and gathered by the lateral collectors 22, 22' to be directed along the horizontal inductors. At those instants when the signal applied to the excitation coils is at a quiescent or average level, the horizontal flux lines gathered by the lateral collectors are confined within the horizontal inductors and likewise the vertical field lines captured by the vertical collectors also pass through the horizontal inductors. On the other hand, when the exciting flux is at a high level, either positive or negative, that is propagating in one direction or the other, the horizontal inductors and lateral and vertical collectors become saturated causing the earth's field lines to move outside these high magnetic permeability members until the exciting flux returns to its quiescent level, at which time the earth's field lines again move internal to the high magnetic permeability members. Thus, four times in each cycle of the excitation signal applied to the excitation coil the earth's horizontal and vertical field lines are caused to move across the windings of the respective pickoff coils, producing output signals thereat having twice the frequency of the excitation signal.

It should now be apparent that pickoff coils could also be wound around the respective equiangularly spaced vertical collectors as indicated at 15', the coils being supported for instance by a bar 38 connecting to centerpost 11. Such placement of the pickoff coils assures that substantially all of the vertical collector field lines are sensed; whereas, in the case of the pickoff coils mounted on the horizontal inductors, some of the collected vertical field lines will not be sensed as a consequence of the coils being displaced inwardly from the extremities of the core legs. Hence, pickoff coils at location 15' provide greater sensitivity to the vertical component of the ambient field. An additional advantage of the inclusion of pickoff coils at 15' is that it allows greater freedom in positioning the coils 15 along the horizontal legs 13 and hence facilitates calibration procedures. It should be noted that the horizontal core leg inductors 14, 14', pickoff coils 15, excitation coil 16 and lateral flux collectors 22, 22' may be eliminated leaving only the generally U-shaped equiangularly oriented core members 26, 26', pickoff coils 15' and excitation coil 27. This resultant structure includes all elements necessary to detect the total ambient magnetic field.

It is therefore seen that pickoff coils 15 or 15' may be used either individually or in appropriate combination for example with the coils of each of the equiangularly spaced inductors connected in series aiding relation, as desired, for sensing the total ambient field. In any case, the equiangularly distributed pickoff coils 15 or 15' when used individually are connected in Y-circuit configuration with one end of each of the coils connected to a common junction and the other ends of the respective coils connected to related output terminals. FIG. 6a depicts such connections wherein the junction point is designated $j$ and the output terminals $a$, $b$ and $c$, respectively.

For purposes of description, it is assumed that coil $a$–$j$ is aligned with the longitudinal axis of the craft in which the valve is mounted and the instantaneous heading of the craft is assumed to be at an angle $\psi$ with respect to the magnetic north reference. In addition, the horizontal and vertical components of the earth's field are considered in terms of subcomponents traversing the respective equiangularly distributed pickoff coils. As an inherent consequence of the typical construction of a valve and arrangement of the pickoff coils therein, it will be recognized that the horizontal field subcomponents may be represented as indicated in the figure by the solid line vectors designated $H_{H1}$, $H_{H2}$ and $H_{H3}$, where $H_H$ represents the horizontal component of the earth's magnetic field and the subnumerals 1, 2 and 3 designate the components of the horizontal field traversing the respective coils, namely $a$–$j$, $b$–$j$ and $c$–$j$. The relative magnitude or density of these subcomponents varies, of course, in accordance with the heading of the craft relative to the magnetic north. Thus, $$H_{H1} = H_H \cos \psi$$

$$H_{H2} = H_H \cos (\psi + 120°)$$

and $$H_{H3} = H_H \cos (\psi - 120°)$$

The vertical field components likewise are represented by the dashed line vectors $H_V$. In this instance $H_V$ represents the vertical component of the earth's magnetic field which has the same density in all three pickoff coils for any attitude of the valve.

Figure 6A:
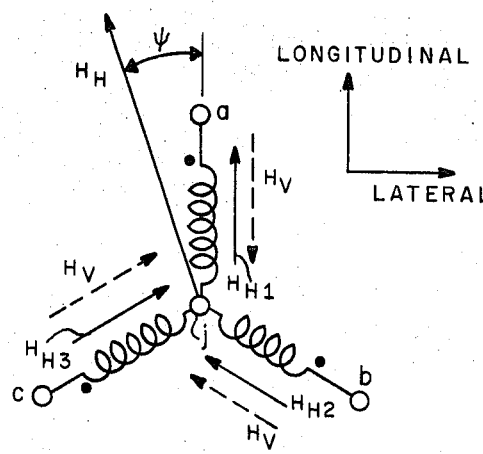
FIG. 6a is a simplified electrical schematic depicting the orientation of the ambient horizontal and vertical field lines relative to the valve pickoff coils.
Figure 6B:
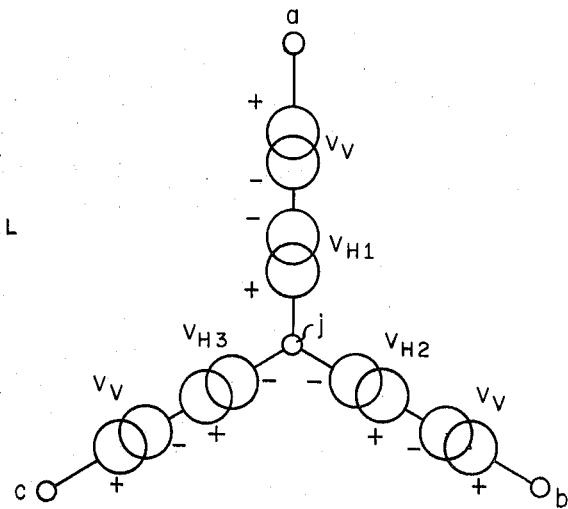
FIG. 6b is a simplified electrical schematic illustrating the relative polarities of the voltages induced in the pickoff coils by the horizontal and vertical fields.

FIG. 6b is a voltage diagram illustrating the relative sense of the output signals provided by the pickoff coils in response to the horizontal and vertical field components directed therethrough as indicated in FIG. 6a. Thus $V_V$, which is a function of the vertical field, represents the voltage induced in each pickoff coil by the vertical magnetic field component while $V_{H1}$, $V_{H2}$ and $V_{H3}$, which are respective functions of the horizontal field subcomponents, represent the voltages induced in each pickoff coil by the horizontal magnetic field component.

A simple mathematical analysis will now be provided to indicate how signals representative of the vertical field and lateral and longitudinal components of the horizontal field may be obtained from the total field sensed by the valve. From FIG. 6b it is seen that:

$$V_{a-j} = V_V - V_H \cos \psi \quad (1)$$

$$V_{b-j} = V_V - V_H \cos (\psi + 120°) \quad (2)$$

$$V_{c-j} = V_V - V_H \cos (\psi - 120°) \quad (3)$$

A signal representative of the vertical field may be obtained from summing the individual pickoff coil voltages, that is:

$$V_{VERT} = V_{a-j} + V_{b-j} + V_{c-j} \quad (4)$$

from which, by substituting equations 1, 2 and 3 in equation 4, it can be shown that $$V_{VERT} = 3V_V$$

A signal representative of the lateral component of the horizontal field is represented by the sum of the voltages across coils b–j and c–j, that is;

$$V_{LAT} = V_{b-c} = V_{b-j} - V_{c-j} \quad (5)$$

from which, by substituting equations 2 and 3 in equation 5, it can be shown that $$V_{LAT} = \sqrt{3} \, V_H \sin \psi$$

Likewise, a signal representative of the longitudinal component of the horizontal field is represented by the sum of the voltages from terminals a to b and terminals a to c, that is:

$$V_{LONG} = V_{b-a} + V_{c-a} = (V_{b-j} - V_{a-j}) + (V_{c-j} - V_{a-j}) \quad (6)$$

from which it can be shown by substituting equations 1, 2 and 3 in equation 6 that $$V_{LONG} = 3V_H \cos \psi$$

Figure 7:
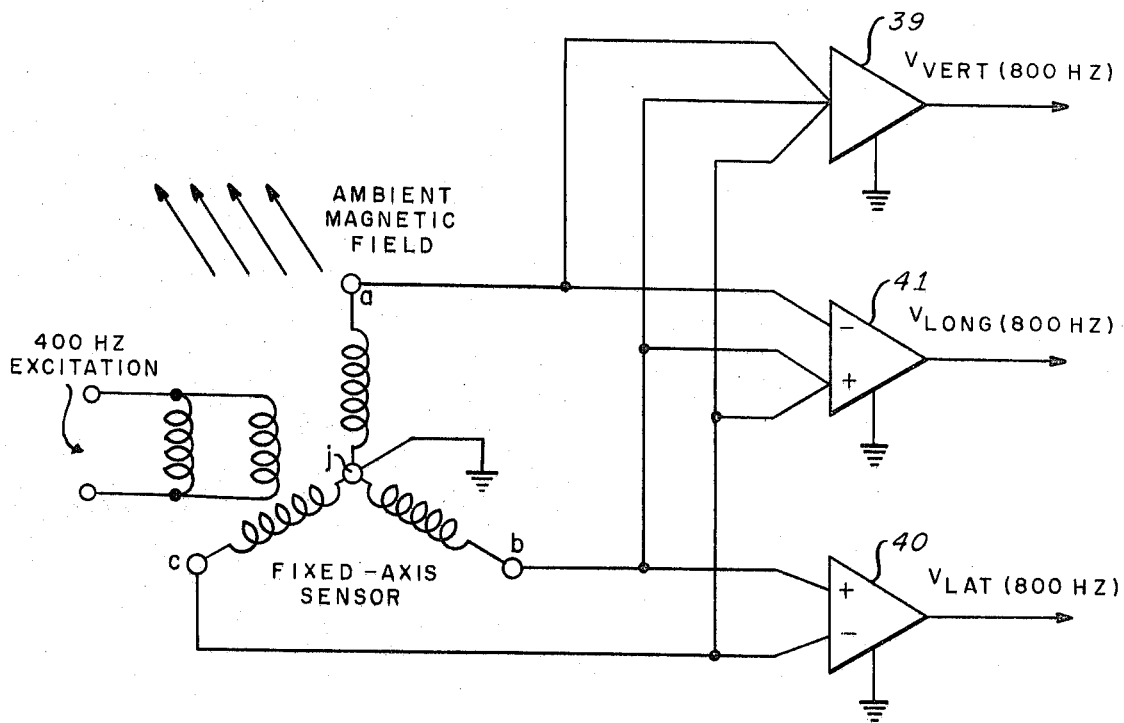
FIG. 7 is a block diagram illustration of signal processing circuits for deriving signals representative of the vertical field and lateral and longitudinal components of the horizontal field respectively from the total field signals provided by the valve pickoff coils.

Implementation of the foregoing equations is readily accomplished by means of the circuit shown in FIG. 7 wherein the input summing point of amplifier 39 connects to terminals a, b and c of the valve pickoff coils to provide signal $V_{VERT}$. $V_{LAT}$ and $V_{LONG}$, on the other hand, are obtained by means of differential amplifiers 40 and 41, respectively. Pickoff coil b–j connects to the non-inverting input and pickoff coil c–j to the inverting input of amplifier 40 to provide signal $V_{LAT}$. In the case of amplifier 41, terminals b and c of the pickoff coils connect to the non-inverting input while terminal a of the coils connects to the inverting input to provide signal $V_{LONG}$. These vertical, lateral and longitudinal signals may then be processed in conventional manner, as is well known to those skilled in the art, to effect coordinate transformations accounting for the roll and pitch attitude of the craft and thereby provide the desired heading information.

While the invention has been described in its preferred embodiment, it is to be understood that the words which have been used are words of description rather than limitation and that changes may be made within the purview of the appended claims without departing from the true scope and spirit of the invention in its broader aspects.

I claim:

1. A flux valve for sensing the total horizontal and vertical unidirectional ambient magnetic field in which the valve is located, comprising non-magnetic support means centrally disposed along a primary axis of the valve, three equiangularly spaced magnetic cores each connected at one end laterally of a common region of the support means and having a section at the other end extending at an angle from a plane normal to the axis such that the cores are symmetrically disposed about the axis and terminate in a plane normal to the axis whereby the cores intercept both the horizontal and vertical ambient magnetic field, each core including a pair of magnetically permeable elongated generally parallel coextensive inductors relatively widely spaced apart at the region of connection to the support means and appreciably closer spaced along at least part of the remaining length of said inductors, exciting coil means magnetically coupled to the equiangularly spaced cores for circulating an exciting magnetic flux in instantaneously opposite directions through the inductors of each core to cause the ambient magnetic field to move cyclically in and out of the cores and thereby cut across pickoff coil means adjacent the respective cores to induce a signal therein representative of the ambient field, and pickoff means adjacent the closer spaced part of the inductors of each core and electrically interconnected with one another in wye circuit configuration to provide three wire output signals representative of the ambient field.

2. The apparatus of claim 1 wherein the exciting coil means includes a coil surrounding the support means between and extending normally to the relatively widely spaced ends of the inductor pair of each core.

3. The apparatus of claim 1 incorporated in a navigable craft magnetic heading system as a strapped-down valve wherein the valve is oriented so that the valve axis and one of the equiangularly spaced cores lie in a plane aligned with the longitudinal axis of the craft for providing signals representative of the vertical ambient magnetic field and lateral and longitudinal components of the horizontal ambient magnetic field, and further including means for summing the signals induced in the pickoff coil means of each core to provide a signal representative of the vertical magnetic field, means for differentially combining the signal induced in the pickoff coil means of the core aligned with the longitudinal axis of the craft with the sum of the signals induced in the pickoff coil means of the other cores to provide a signal representative of the longitudinal component of the horizontal magnetic field, and means for differentially combining the signals induced in the pickoff coil means of said other cores to provide a signal representative of the lateral component of the horizontal magnetic field.

4. A flux valve for sensing the total horizontal and vertical unidirectional ambient magnetic field in which the valve is located, comprising non-magnetic support means centrally disposed along a primary axis of the valve, three equiangularly spaced magnetic cores each connected at one end laterally of a first region of the support means and having a section extending obliquely of the axis such that the cores are symmetrically disposed about the axis and connected at the other end laterally of a second region of the support means spaced along the axis from said first region whereby the cores intercept both the horizontal and vertical ambient magnetic field, each core including a pair of magnetically permeable elongated generally parallel coextensive inductors relatively widely spaced at the regions of connection to the support means and elsewhere at least in part appreciably closer spaced, exciting coil means magnetically coupled to the equiangularly spaced cores for circulating an exciting magnetic flux in instantaneously opposite directions through the inductors of each core to cause the ambient magnetic field to move cyclically in and out of the cores and thereby cut across pickoff coil means adjacent the respective cores to induce a signal thereby representative of the ambient field, and pickoff coil means adjacent the closer spaced part of the inductors of each core and electrically interconnected with one another in wye circuit configuration to provide three wire output signals representative of the ambient field.

5. The apparatus of claim 4 incorporated in navigable craft magnetic heading system as a strapped-down valve wherein the valve is oriented so that the valve axis and one of the equiangularly spaced cores lie in a plane aligned with the longitudinal axis of the craft for providing signals representative of the vertical ambient magnetic field and lateral and longitudinal components of the horizontal ambient magnetic field, and further including means for summing the signals induced in the pickoff coil means of each core to provide a signal representative of the vertical magnetic field, means for differentially combining the signal induced in the pickoff coil means of the core aligned with the longitudinal axis of the craft with the sum of the signals induced in the pickoff coil means of the other cores to provide a signal representative of the longitudinal component of the horizontal magnetic field, and means for differentially combining the signals induced in the pickoff coil means of said other cores to provide a signal representative of the lateral component of the horizontal magnetic field.

6. The apparatus of claim 4 wherein the exciting coil means includes a coil surrounding the support means between and extending normally to the relatively widely spaced ends of the inductor pair of each core at one of the regions of connection thereof to the support means.

7. The apparatus of claim 4 wherein the exciting coil means includes a first coil surrounding the support means between and extending normally to the relatively widely spaced ends of the inductor pair of each core at said first region and a second coil surrounding the support means between and extending normally to the relatively widely spaced ends of the inductor pair of each core at said second region and connected in series aiding relation with the first coil.

8. The apparatus of claim 4 wherein the pickoff coil means adjacent each core comprises a first pickoff coil located at a first closer spaced part of the core inductors and a second pickoff coil located at a second closer spaced part of the core inductors and connected in series aiding relation with the first pickoff coil.

9. The apparatus of claim 8 wherein the exciting coil means includes a coil surrounding the support means between and extending normal to the relatively widely spaced ends of the inductor pair of each core.

10. The apparatus of claim 8 wherein the exciting coil means includes a first coil surrounding the support means between and extending normally to the relatively widely spaced ends of the inductor pair of each core at said first region and a second coil surrounding the support means between and extending normally to the relatively widely spaced ends of the inductor pair of each core at said second region and connected in series aiding relation with the first coil.

11. The apparatus of claim 4 wherein the cores are constructed so as to extend at least in part obliquely to the axis in symmetrically disposed relation about the axis from the first region of connection to the support means substantially to a plane normal to the axis and then extend laterally inward in substantially coplanar relation to the second region of connection to the support means, and further including magnetically permeable elongated arcuate flux collectors each connected at its midpoint to a respective core inductor at the outer end of the substantially coplanar portion of the core and extending laterally of the respective inductor such that the extremities of the flux collectors associated with each inductor pair are coupled to one another.

12. The apparatus of claim 11 wherein the exciting coil means includes a first coil surrounding the support means between and extending normally to the relatively widely spaced ends of the inductor pair of each core at said first region and a second coil surrounding the support means between and extending normally to the relatively widely spaced ends of the inductor pair of each core at said second region and connected in series aiding relation with the first coil.

13. The apparatus of claim 12 wherein the pickoff coil means adjacent each core comprises a first pickoff coil located at a first closer spaced part of the core inductors and a second pickoff coil located at a second closer spaced part of the core inductors and connected in series aiding relation with the first pickoff coil.

* * * * *